Dec. 22, 1931.  G. W. O'KEEFFE  1,837,830
ELECTRIC SWITCH AND UNDERVOLTAGE PROTECTIVE DEVICE
Filed April 27, 1928  2 Sheets-Sheet 1

Inventor.
George W. O'Keeffe
by
atty

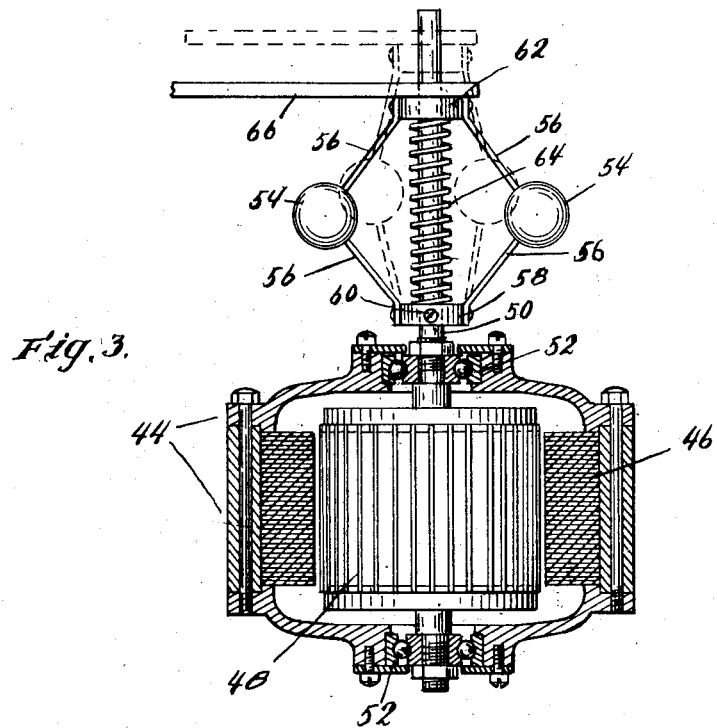
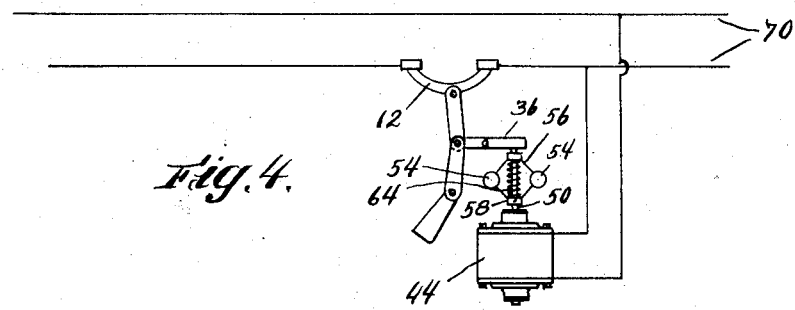

Patented Dec. 22, 1931

1,837,830

UNITED STATES PATENT OFFICE

GEORGE W. O'KEEFFE, OF MILTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

ELECTRIC SWITCH AND UNDERVOLTAGE PROTECTIVE DEVICE

Application filed April 27, 1928. Serial No. 273,370.

This invention relates to electric switches and devices for automatically opening the switch when the potential on the switch circuit fails or drops to a predetermined value.

The usual undervoltage switch tripping device operates instantaneously upon reduction or failure of voltage in the switch circuit to trip open the switch.

It frequently happens that the reduction of voltage on a circuit is but momentary and that the potential of the circuit is almost immediately restored to its full value. It is undesirable to open the circuit upon what is merely a momentary reduction in potential since it needlessly shuts down apparatus operated from the circuit and necessitates the services of an attendant to close the switch and to restart the apparatus on the circuit. If, however, the failure of potential exists for a considerable period of time, it is desirable to have the switch open. An object of the present invention is the provision of an electric switch and undervoltage tripping mechanism therefor so arranged that the undervoltage tripping mechanism will not operate to trip open the switch immediately upon a failure or reduction of potential of the switch circuit but only after the expiration of a sensible amount of time, if normal potential has not been restored to the line during this period.

A further object of the invention is the provision of an electric switch and undervoltage tripping mechanism therefor wherein the undervoltage tripping mechanism includes an electric motor which preferably is operated from the circuit including the switch and which is maintained continuously in rotation for so long as the line is energized at normal potential. When potential fails on the line, or falls below a predetermined value, the motor becomes insufficiently energized and so stops rotating or slows down to a reduced speed of rotation. When the motor speed falls below a certain amount, the motor is arranged to effect the opening of the switch. The time required for the motor to slow down provides the time period of delayed opening of the switch.

A further object of the invention is to improve the construction and operation of electric switches and undervoltage opening devices therefor.

Fig. 3 is an enlarged sectional elevation of the undervoltage device.

Fig. 4 is a diagram of the circuit connections of the switch and the undervoltage device.

Figures 1, 2:
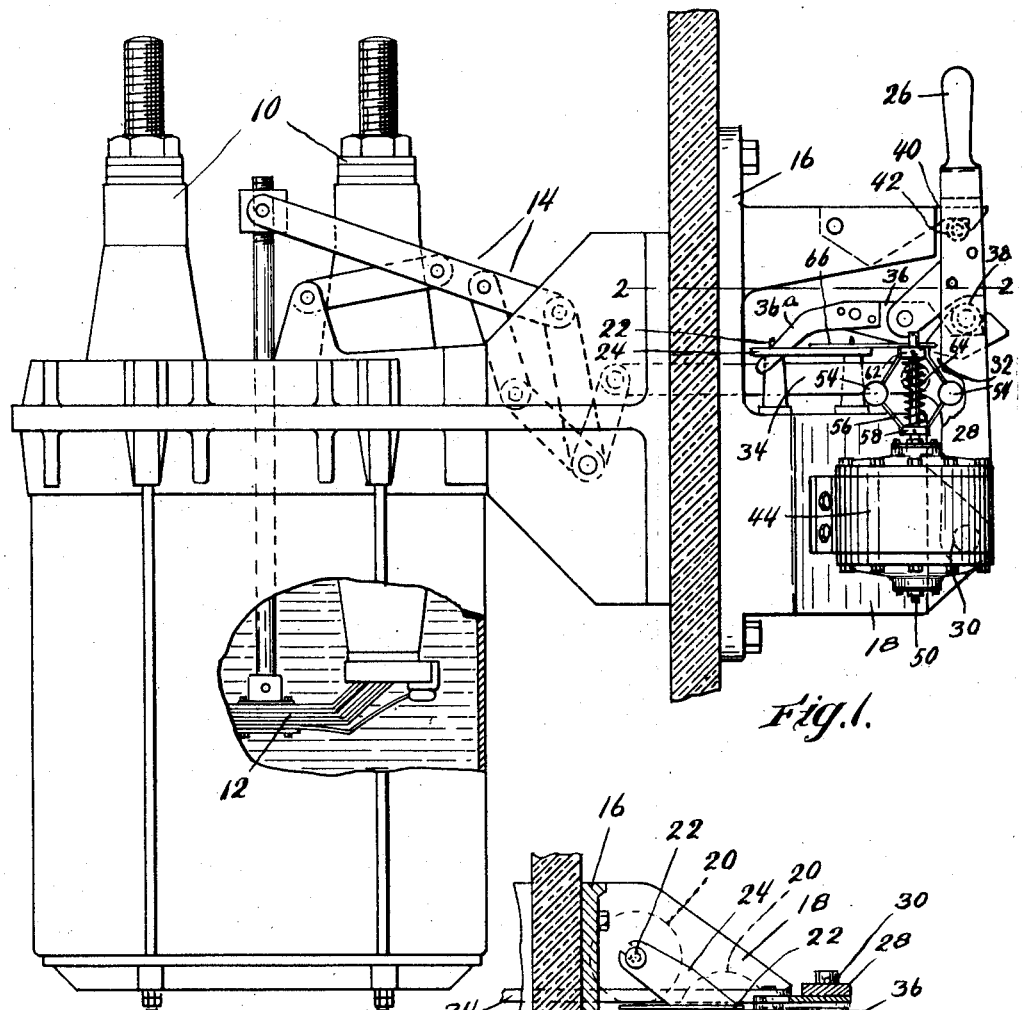
Fig. 1 is a front elevation of an electric switch and a time delayed undervoltage device embodying the invention.
Fig. 2 is a plan view of the switch operating mechanism and retarded undervoltage tripping device taken along 2—2 of Fig. 1.

The electric switch here shown comprises the stationary switch members 10 and the movable switch member 12 which is operated by operating mechanism 14 from a face plate 16. Said face plate has a coil box 18 at the bottom in which the usual overload and other tripping coils 20 are located. Said tripping coils are provided with plungers 22 which are adapted to be raised to effect the opening of the switch. A triangular tripping plate 24 is associated with all of said plungers and is so arranged that the plate is raised whenever any one coil and also when all coils are sufficiently energized, thus to effect tripping of the switch. The switch is provided with an operating handle 26 which has a pair of spaced arms 28 that are pivoted at their lower ends on a pin 30 carried by the front wall of the coil box. An arm 32 is located between the arms of the operating handle and also is pivoted on said pin 30. Said arm is connected with the operating mechanism 14 by means of links 34. A latch 36 is pivotally carried by the operating handle and engages a latch roller 38 carried by the arm 32 thus to lock the switch mechanism to the handle. The handle is latched releasably in switch closed position to the face plate by a handle locking latch 40 which is pivoted to the face plate and engages a latch roller 42 carried by the handle. When any one of the coils 20 is sufficiently energized the tripping plate 24 is raised into engagement with the tail 36a of the latch 36, thus to move the latch from cooperative relation with the latch roller 38.

The switch consequently moves to open position by its own weight while the handle stays latched to the face plate. The handle can be unlatched manually and moved to switch open position where it will again effect connection between the latch 36 and the switch operating arm 32 so that the switch can again be closed.

The mechanism so far described is shown and claimed in an application of Chester D. Ainsworth filed December 13, 1922, Serial No. 606,678 which became Patent No. 1,729,859 on October 1, 1929.

In accordance with this invention, I provide time delayed undervoltage mechanism to effect the opening of a switch after the potential on the switch circuit has failed or has been reduced for a predetermined period of time. The undervoltage tripping device is illustrated specifically in Fig. 3. It comprises a free-running electric motor 44 here shown as a single phase squirrel cage induction motor comprising the stator 46 and rotor 48 which rotor is fixed to a shaft 50 journalled in bearings 52 of the motor frame. The motor is provided with an inertia or centrifugal device which, as here shown, comprises essentially heavy weights 54 which are fixed to flexible, as spring, strips 56, the lower ends of which are attached to a collar 58 fixed to the shaft 50 by means of a set screw 60 and the upper ends of which are attached to a collar 62 which is slidable on said shaft. A helical spring 64 encircles said shaft and bears against both collars and, when the motor is idle, serves to raise the upper slidable collar 62 into the dotted line position illustrated in Fig. 3.

The motor is attached to a side wall of the coil box 18 of the face plate with the shaft in vertical position. The tripping plate 24 has an extension 66 which overlies the upper collar 62 of the motor and has a slot 68 in the end through which the upper end of the motor shaft loosely projects. When the collar 62 is in an elevated position on the shaft, it is adapted to raise the extension 66 and consequently the tripping plate 24 sufficiently to trip the latch 36 and effect the opening of the switch. The normal position of the collar 62 is below the extension 66 when the switch is closed and the switch circuit is under normal potential.

The motor is here shown as connected directly across the switch circuit 70, although it can be energized in other well known ways not necessary to illustrate here.

When the switch is closed and the switch circuit is under normal potential, the motor will be rotating at its normal speed and will rotate so long as the switch circuit is normally energized. Due to the rotation of the motor, the weights 54 will be thrown out by centrifugal force and the sliding collar 62 will be pulled down against the action of the spring 64 into a position in which it is away from operative relation with the extension 66 of the tripping plate, thus to maintain the switch closed.

When potential on the switch circuit fails or the potential is lowered to a detrimental value, the motor will be insufficiently energized and so will slow down. The centrifugal force on the weights 54 is thus reduced so that the spring 64 can move up the collar 62 and thus ultimately effect the tripping of the switch. The motor is adapted to run freely and without any particular load thereon so that it can run without being energized for a sensible period of time before the spring operates to move up the collar 62 sufficiently to trip the switch. This time delay in the opening of the switch is sufficient for the purpose.

If full potential is restored to the line before the motor has slowed down sufficiently to trip the switch, it will immediately begin to speed up and to throw out the weights 54 and thus prevent the tripping of the switch. The extent of the time delay can be varied by varying the positions of the collar 58 on the shaft 50, the set screw 60 being provided for this purpose.

The period of time delay can also be varied by varying the amount of inertia in the rotating parts of the motor as, for instance, by making the weights 54 lighter or heavier.

The induction motor here shown is an exceedingly simple and reliable piece of apparatus and has no delicate parts or latches that are liable to get out of order. It can also be very cheaply constructed.

The fact that the motor is running continuously when the switch circuit is normally energized gives a continuous indication of the operativeness of the device.

Many types of undervoltage tripping devices must be reset manually as soon as full potential is restored to the line as otherwise their energizing windings will become overheated and burn out due to the fact that when they operate a relatively long air gap is interposed in the magnetic circuit of the winding. This trouble is not present in the present invention since the character of the magnetic circuit remains unaltered and the motor comes up to speed and thus restores the inductance of the actuating winding of the motor to its normal value before the winding has an opportunity to become overheated when full potential is restored to the circuit.

I claim:

1. The combination of an electric switch having switch operating mechanism and controlling mechanism for said switch operating mechanism including a continuously rotatable free-running electric motor energized from the switch circuit and means operated by a reduction in speed of said motor to effect a change in the condition of the switch.

2. The combination of an electric switch having switch mechanism, and tripping mechanism for said switch including a free-running normally rotating electric motor energized from the switch circuit and means operable upon a suitable reduction of speed of said motor to effect the opening of the switch.

3. The combination of an electric switch, means to hold said switch closed, and opening means for said switch including a free-running normally rotating electric motor energized from the switch circuit and means operable upon a suitable reduction in speed of said motor to effect the opening of the switch.

4. The combination of an electric switch, a latch to hold the switch releasably closed, a free-running normally rotating electric motor energized from the switch circuit, and means operable upon a suitable reduction in speed of said motor to operate said latch and effect the opening of the switch.

5. The combination of an electric switch, means releasably holding the switch closed, and undervoltage opening means for the switch including a normally rotating electric motor energized by power derived from the switch circuit and means operable by said motor upon a suitable reduction in speed thereof to actuate said holding means and effect the opening of the switch.

6. The combination of an electric switch, means releasably holding the switch closed, and undervoltage opening means for the switch including an electric motor energized by power derived from the switch circuit and rotating continuously so long as normal potential exists on the switch circuit, and means operated by said motor when the potential thereof is reduced and upon a suitable reduction in speed of said motor to actuate said holding means and effect the opening of the switch.

7. The combination of an electric switch, operating means therefor, and a protective device including a free-running electric motor the operation of which is governed by the condition of the switch circuit, and speed responsive mechanism operated by said electric motor and arranged to operate said switch mechanism and effect a change in the condition of the switch.

8. The combination of an electric switch, operating mechanism therefor including a latch to hold the switch releasably closed, overload responsive mechanism to operate said latch and effect the opening of the switch, and undervoltage responsive mechanism to open the switch including a normally rotating electric motor responsive to the potential of the switch circuit and means operated upon a suitable reduction of speed of said motor to operate said latch and effect the opening of the switch.

9. The combination of a switch, opening means for said switch, and operating means for said opening means including a free-running normally rotating electric motor deriving power from said circuit, and a centrifugal device for operating said opening means, said device being driven by said motor and normally maintained out of operative relation with said switch opening means by the speed of said motor and arranged to be moved into operative engagement with said opening means upon a suitable reduction of speed of said motor.

10. The combination of an electric switch, holding means therefor, a free-running normally rotating electric motor, and means under control of said rotating motor and operable upon a suitable reduction in speed thereof to operate said holding means, said motor requiring a substantial period of time to slow down sufficiently before said holding means can be operated.

11. The combination of an electric switch, means releasably holding the switch in closed position, and undervoltage tripping mechanism for the switch including a freely running normally rotating electric motor having a substantial amount of inertia whereby it can rotate for a substantial period of time without normal energization and speed responsive means operated by said motor after a suitable reduction in speed thereof arranged to operate said switch holding means and effect the opening of the switch.

12. The combination of an electric switch, a latch for holding the switch closed, and undervoltage tripping mechanism for the switch including a normally rotating electric motor energized from the switch circuit, weights flexibly connected with the rotor of and rotated by the motor and arranged to be held in distended position when the motor is rotating at normal speed, an operating member having flexible connections with said weights arranged to be held in a normally inoperative position thereby, and a spring acting on the aforesaid member in opposition to said weights, said spring operating to move said member into a position to effect the tripping of the latch and the opening of the switch when the speed of said motor is suitably reduced.

13. An undervoltage protective device for an electric switch, including stationary and movable means providing a magnetic circuit of constant reluctance, an energizing winding associated with one of said members arranged to effect the movement of said movable member, and switch opening means associated with and controlled by said movable member.

14. An undervoltage protective device for an electric switch, including stationary and movable means providing a magnetic circuit of constant reluctance, an energizing winding associated with one of said members arranged to effect the movement of said movable member without changing the reluctance of said magnetic circuit, and switch opening means associated with and controlled by said movable member.

In testimony whereof, I have signed my name to this specification.

GEORGE W. O'KEEFFE.